US011495081B2

(12) United States Patent
Suslik et al.

(10) Patent No.: US 11,495,081 B2
(45) Date of Patent: Nov. 8, 2022

(54) RECEDING INTERACTIVE DISPLAY SYSTEM FOR A GAMING SYSTEM

(71) Applicant: Aristocrat Technologies Australia Pty Limited, North Ryde (AU)

(72) Inventors: Igor Suslik, St Ives (AU); Matthew Chan, East Killara (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 17/189,159

(22) Filed: Mar. 1, 2021

(65) Prior Publication Data

US 2021/0312755 A1 Oct. 7, 2021

(30) Foreign Application Priority Data

Apr. 2, 2020 (AU) ................................ 2020901031
Sep. 25, 2020 (AU) ................................ 2020239806

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3211* (2013.01); *G07F 17/3216* (2013.01)

(58) Field of Classification Search

USPC .......................... 463/20, 22, 25, 30, 31, 39

See application file for complete search history.

(56) References Cited

U.S. PATENT DOCUMENTS 9,177,441 B2 11/2015 Jaffe
2010/0267439 A1 * 10/2010 Englman ............ G07F 17/3274 463/20

* cited by examiner

*Primary Examiner* — Adetokunbo O Torimiro

(74) *Attorney, Agent, or Firm* — McAndrews, Held & Malloy, Ltd.

(57) ABSTRACT

Embodiments of the disclosure provide an improved display system for a gaming system comprising a bank of gaming machines. In particular embodiments, the display system comprises display elements that are spatially arranged relative to one another in a manner such that when an animation is displayed on the display elements, the spatial arrangement of the display elements relative to each other interacts with the animation to provide a greater apparent depth in the animation. In some embodiments, the display system further comprises a display element positioned between each pair of adjacent gaming machines and controlled to display a graphical representation indicative of a level of a jackpot, which representation is updated as players place wagers on the gaming machines. Methods for operating the gaming system comprising elements of the improved display system are also provided.

20 Claims, 14 Drawing Sheets

RECEDING INTERACTIVE DISPLAY SYSTEM FOR A GAMING SYSTEM

RELATED APPLICATION(S)

The present application claims priority to Australian Patent Application No. AU 2020901031, filed Apr. 2, 2020, and Australian Patent Application No. AU 2020239806, filed Sep. 25, 2020, which are hereby incorporated by reference in their entireties.

FIELD

The present application relates to the field of gaming machines and includes a display system for a gaming system, a gaming system, and methods for operating a gaming system.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In accordance with embodiments, an improved display system for a gaming system comprising a bank of gaming machines is provided, the display system comprising display elements that are spatially arranged relative to one another in a manner such that when an animation is displayed on the display elements, the spatial arrangement of the display elements relative to each other interacts with the animation to provide a greater apparent depth in the animation, thus resulting in an enhancement of the appearance of the display system and an improved visual experience for players engaged in a game on the gaming machines. Further, in accordance with embodiments, the display system further comprises a display element positioned between each pair of adjacent gaming machines and the display element being controlled to display a graphical representation indicative of a level of a jackpot, wherein the graphical representation is updated over time to provide an updated level of the jackpot as players are engaged and place wagers in games of chance on the gaming machines. Methods for operating the gaming system comprising elements of the improved display system are also provided.

In a first aspect, there is provided a display system for a gaming system comprising a bank of gaming machines, the display system comprising: first and second display elements; and a display controller coupled to the first and second display elements and arranged to control the display of respective graphical representations on each of the first and second display elements in a manner such that, in use, an animation is displayed on the first and second display elements, wherein the animation comprises components arranged to provide a visual effect of the components receding into the background; wherein the first and second display elements are configured to be mounted relative to the gaming machines in a manner such that the first display element is mounted above the gaming machines and the second display element is mounted above, and set back relative to, the first display element, and wherein the configuration of the first and second display elements, relative to each other and relative to the gaming machines, interacts with the components of the animation displayed on the first and second display elements in order to enhance the visual effect of the components receding into the background.

At least one of the first display element and the second display element may comprise at least two display panels.

In one embodiment, the display controller is arranged to control the display of respective graphical representations on each of the first and second display elements in a manner such that the animation displayed on the first and second display elements comprises at least two stepped levels associated with respective levels of first indicia.

In one embodiment, the display controller is arranged to control the animation displayed on the first and second display elements in a manner such that the animation comprises: a steady component indicative of respective levels of the first indicia in the stepped levels displayed on the first and second display elements; and a moving component displayed at a moving rate, the moving component being associated with the first indicia and providing an impression that at least some of the first indicia are moving from one stepped level down to another stepped level.

The steady component may be associated with a level of a jackpot distributable to the gaming machines.

In one embodiment, the first indicia are associated with coins, the steady component is indicative of respective levels of coins in the stepped levels, and the moving component provides an impression that coins are moving from one stepped level down to another stepped level. In this embodiment, the display controller may be arranged to control the animation displayed on the first and second display elements in a manner such that at least one of the respective levels of coins increases when a level of a jackpot distributable to the gaming machines increases to a next jackpot level. The display controller may further be arranged to control the animation displayed on the first and second display elements in a manner such that the moving rate of the moving component increases when the jackpot increases in a defined period at a rate that is above a threshold.

In one embodiment, the display system further comprises a jackpot display element wherein the display controller is coupled to the jackpot display element and arranged to control the display of a graphical representation on the jackpot display element in a manner such that a numeric representation of a jackpot value distributable to the gaming machines is displayed.

In a second aspect, there is provided a method of operating a gaming system comprising a bank of gaming machines and first and second display elements configured to be mounted relative to the bank of gaming machines in a manner such that the first display element is mounted above the gaming machines and the second display element is mounted above and set back relative to the first display element, the method comprising: displaying respective graphical representations on each of the first and second display elements; and controlling, using a display controller of the gaming system, the display of the respective graphical representations in a manner such that, in use, an animation is displayed on the first and second display elements; wherein the animation comprises components arranged to provide a visual effect of the components receding into the background, and wherein the animation displayed on the first and second display elements interacts with the configuration of the first and second display elements relative to the gaming machines in order to enhance the visual effect of the components of the animation receding into the background.

In a third aspect, there is provided a gaming system comprising: a bank of at least two gaming machines; a display element configured to be mounted between each pair of adjacent gaming machines of the bank of at least two gaming machines and arranged to display a graphical representation indicative of a current level of a jackpot distributable to the gaming machines; and a system controller coupled to the bank of at least two gaming machines and to the display element; wherein the system controller is arranged to: receive from each gaming machine input information based on a wager placed by a user in a game of chance, the input information defining a value of a jackpot increment contributing to a jackpot value for the bank of at least two gaming machines; determine whether the input information raises the value of the jackpot above one or more threshold value; and in response to determining that the input information raises the value of the jackpot above a threshold value, control the display element to display an updated graphical representation indicative of a next level of the jackpot distributable to the gaming machines.

The system controller may be further arranged to control the display element to display an animation comprising: a steady component indicative of a level of first indicia associated with the level of the jackpot; and a moving component associated with the first indicia and providing an impression that at least some of the first indicia are moving, whereby an impression that the level of the jackpot is increasing is provided.

In this embodiment, the system controller may be arranged to control the steady component in a manner such that in response to determining that the input information raises the value of the jackpot above the threshold value, the steady component is indicative of an updated level of the first indicia associated with the next level of the jackpot distributable to the gaming machines.

The moving component of the animation may in use be displayed at a first moving rate and the system controller may further arranged to: determine a rate of a jackpot increase in a defined period based on the input information received from each gaming machine; determine whether the rate of the jackpot increase is above a threshold rate value; and in response to determining that the rate of the jackpot increase is above the threshold rate value, control the display of the moving component of the animation in a manner such that the moving component is displayed at a second moving rate faster than the first rate, whereby an impression that the first indicia are moving faster is provided.

In one embodiment, the first indicia are associated with coins, the steady component is indicative of a level of coins associated with the level of the jackpot, and the moving component provides an impression that coins are moving, whereby an impression that the level of the jackpot is increasing is provided.

In one embodiment, the display element comprises at least one display panel.

In a fourth aspect, there is provided a method of operating a gaming system comprising a bank of at least two gaming machines, a display element configured to be mounted between each pair of adjacent gaming machines of the bank of at least two gaming machines, and a system controller coupled to the bank of at least two gaming machines and to the display element, the method comprising: receiving, by the system controller, input information from each gaming machine, the input information being based on a wager placed by a user in a game of chance and defining a value of a jackpot increment contributing to a jackpot value for the bank of at least two gaming machines; determining, by the system controller, whether the input information raises the value of the jackpot above one or more threshold value; and in response to determining that the input information raises the jackpot value above a threshold value, controlling the display element using the system controller to display an updated graphical representation indicative of a next level of the jackpot distributable to the gaming machines.

BRIEF DESCRIPTION OF THE DRAWINGS

Notwithstanding any other forms which may fall within the scope of the disclosure as set forth in the Summary, specific embodiments will now be described, by way of example only, with reference to the accompanying drawings in which.

DETAILED DESCRIPTION

Embodiments of the present disclosure represent a technical improvement in the art of electronic gaming machines, systems, and operating for such electronic gaming machines or systems. For example, at least some embodiments of the present disclosure employ a display system for a bank of gaming machines. In such embodiments, the display system includes a plurality of display elements arranged in different levels mounted above the bank of gaming machines. The display system also includes a display controller that controls the display elements to display graphical representations including animations that include components providing a visual effect of the components receding into a background. The display system also allows the components to interact with each other visually. For example, some of the components may be configured to remain displayed on one display element, while other components may be configured to move from one display elements to another. The movements of the components may indicate a level of prize or accumulated award winnable by a player.

Thus, embodiments of the present disclosure are not merely new game rules or simply new display patterns, but provide technologic improvements in gaming technology to provide improved game display structures in the art of electronic gaming machines and the software for such electronic gaming machines. Moreover, the above example is not intended to be limiting, but merely exemplary of technologic improvements provided by some embodiments of the present disclosure. Technological improvements of other embodiments are readily apparent to those of ordinary skill in the art in light of the present disclosure.

Figure 1:
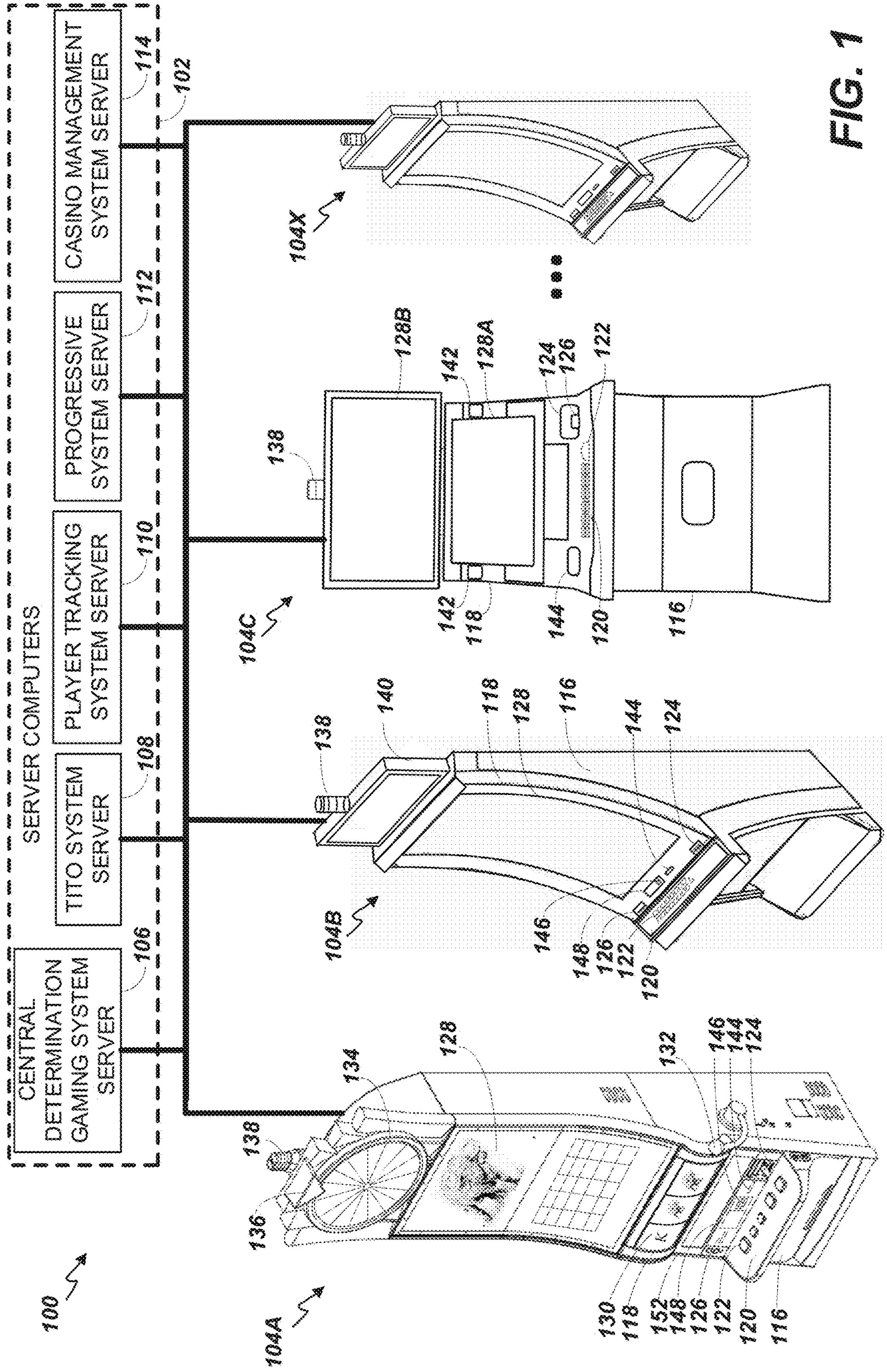
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
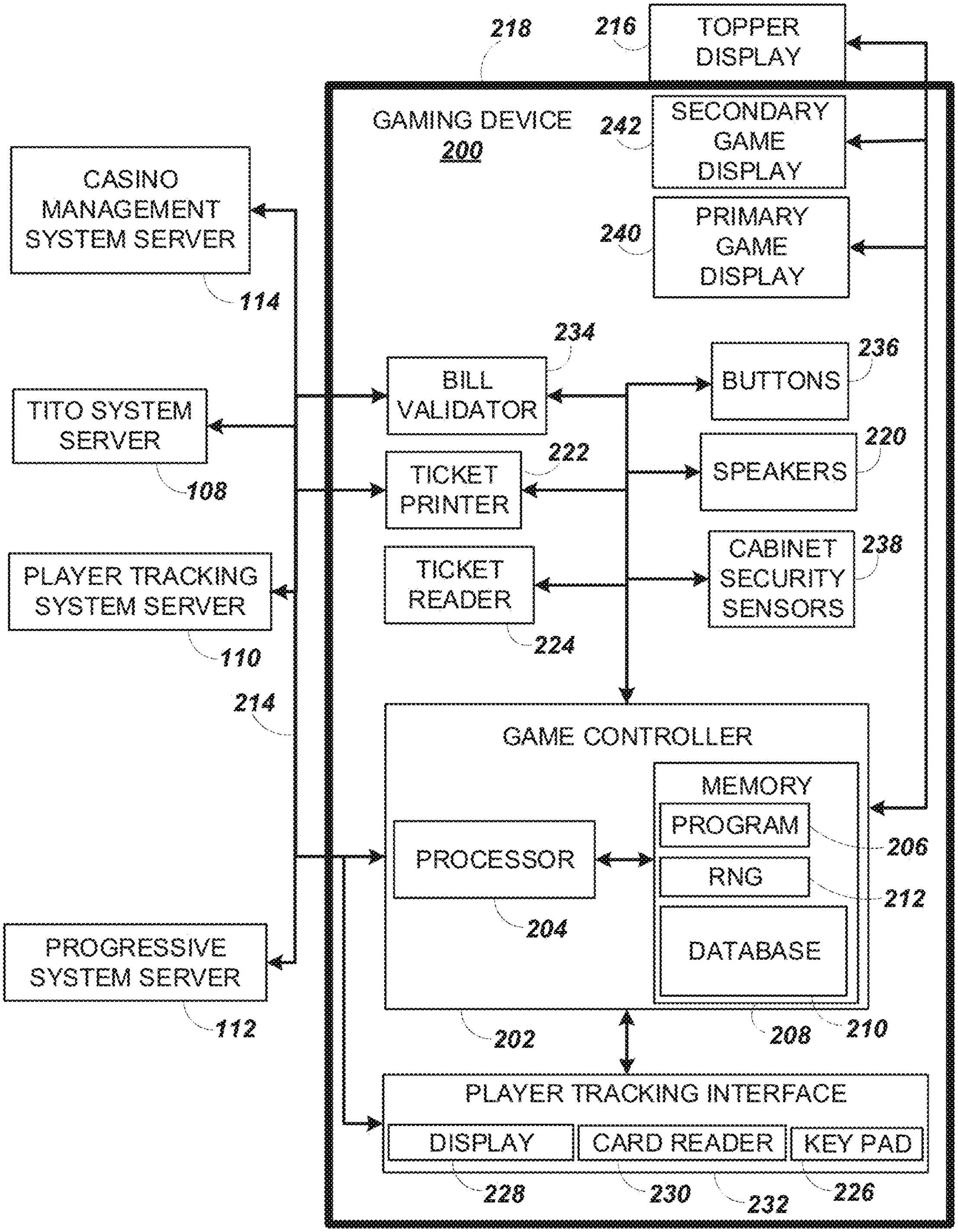
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

While an example gaming device 200 has been described regarding FIG. 2A, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming device 200. In particular, the gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select, from the list, a game that they wish to play.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

Certain embodiments provide an improved display system for gaming systems comprising a bank of gaming machines and improved methods of operating the gaming systems comprising the improved display system. The combination of a spatial arrangement of display elements of the display system relative to one another and an animation displayed using the display elements provides greater apparent depth in the animation, thus resulting in an enhancement of the appearance of the display system and an improved visual experience for players engaged in a game on the gaming devices. Such improved visual experience may further enhance the gaming experience of players, including entertainment, excitement, and engagement in games played on the gaming devices.

Figure 3:
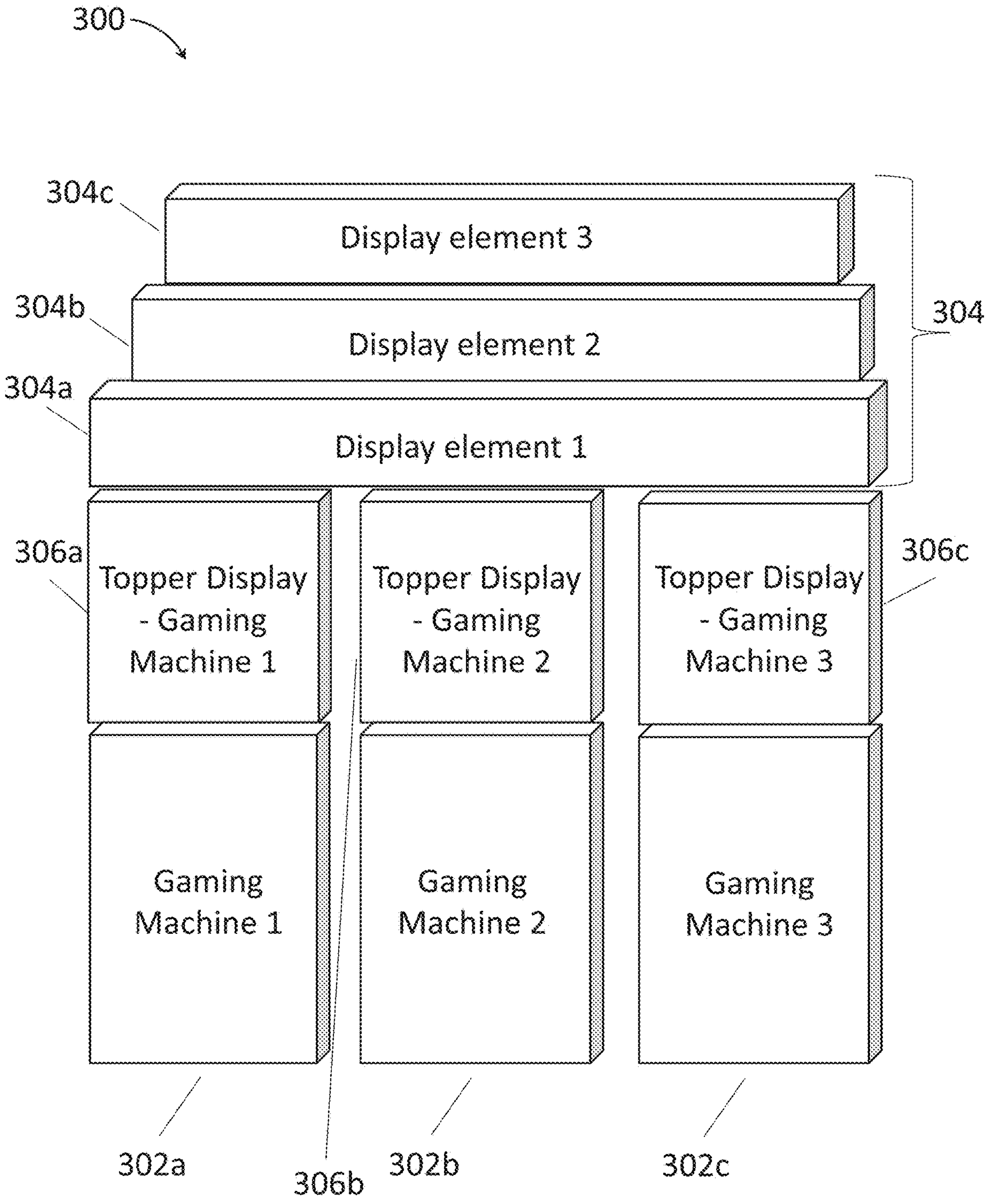
FIG. 3 is a schematic perspective representation of a gaming system in accordance with an embodiment.
Figure 4:
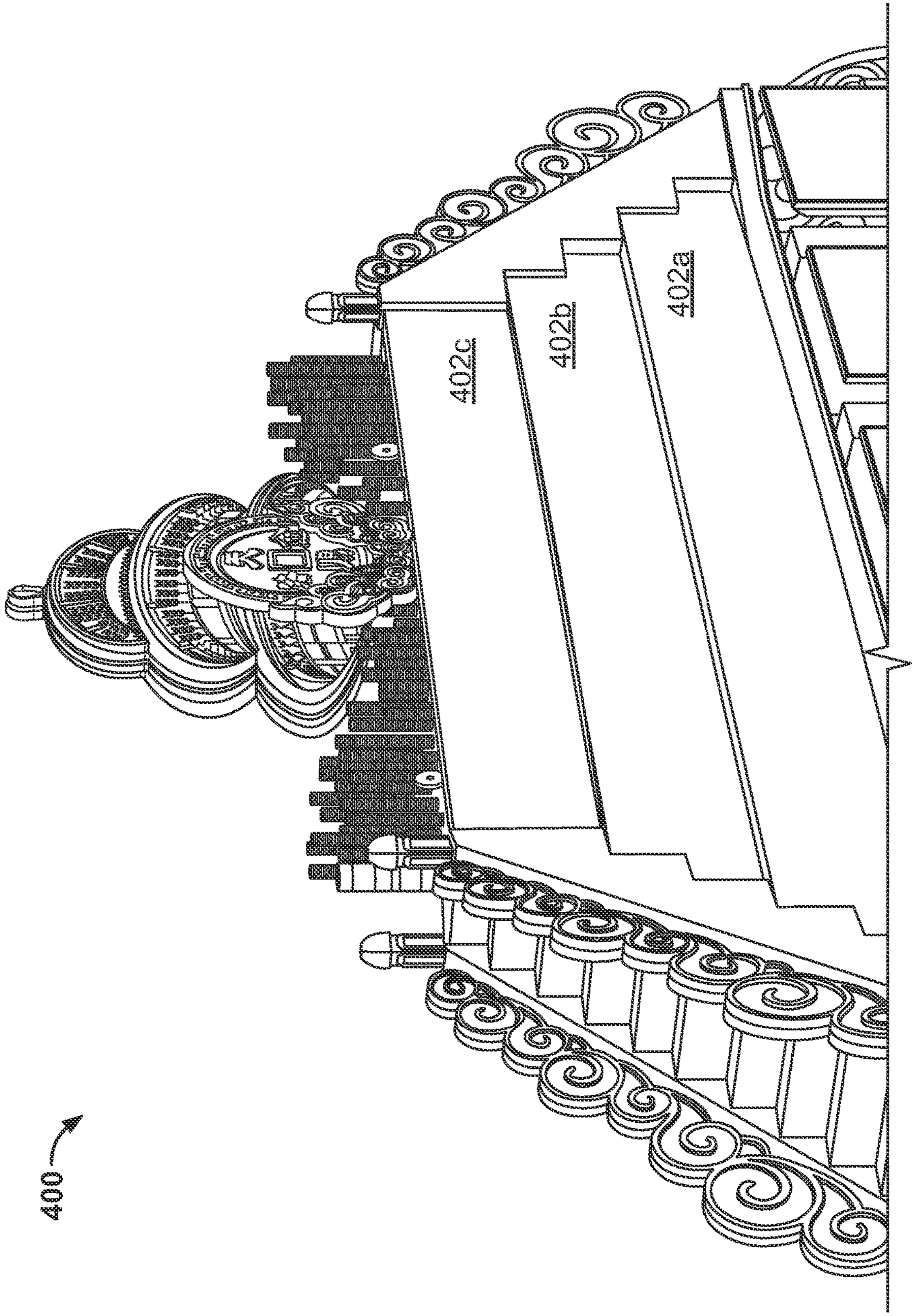
FIG. 4 is a design drawing representing a perspective close-up view of a display system for a gaming system comprising a bank of gaming machines in accordance with an embodiment.
Figure 5:
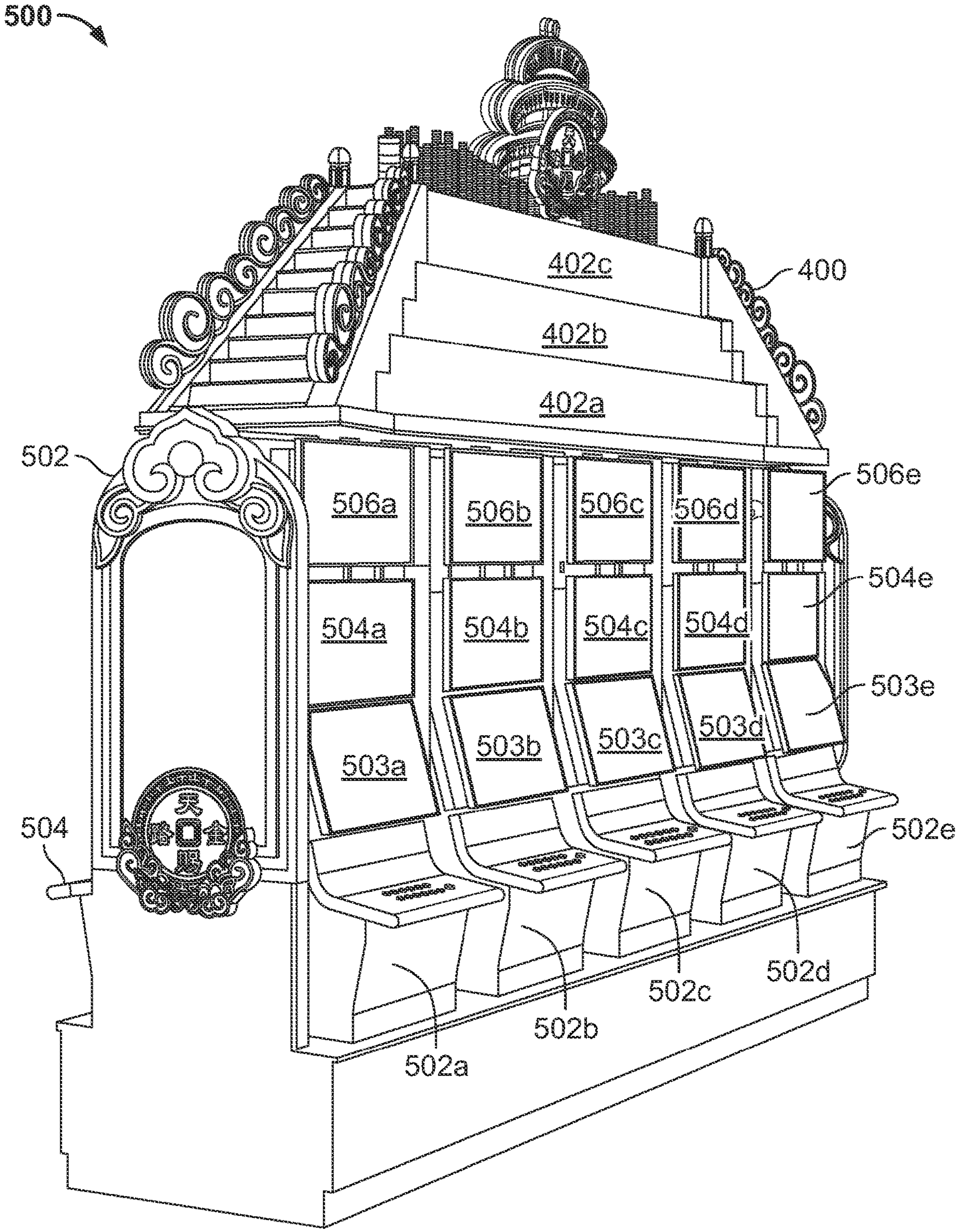
FIG. 5 is a design drawing representing a perspective view of a gaming system comprising the display system of FIG. 4 mounted above a bank of gaming machines in accordance with an embodiment.

FIGS. 3 to 5 relate to a display system for a gaming system provided in accordance with an embodiment. FIG. 3 shows a schematic perspective representation of gaming system 300, which comprises a bank of gaming machines 302 and a display system 304 having a plurality of display elements 304*a*, 304*b*, 304*c*, and which is mounted above the bank of gaming machines 302. In this respect, in some examples, the display system 304 will be supplied separately from the gaming machines 304 and installed above them. In the present illustrated example, the bank of gaming machines comprises three gaming machines 302*a*, 302*b*, and 302*c*, however it will be understood that the bank of gaming machines may comprise any other appropriate number of gaming machines and may comprise two gaming machines or more than three gaming machines, such as although not limited to four or five gaming machines and the display system can be sized to suit. Each of the gaming machines 302*a*, 302*b*, 302*c* may be any gaming machine suitable for operation and use in a gaming environment such as a casino and may for example be any of the gaming devices illustrated and described with reference to FIGS. 1 and 2, for example, with gaming machines without topper displays.

In this example, each gaming machine 302*a*, 302*b*, 302*c* is equipped with a respective topper display 306*a*, 306*b*, 306*c* mounted above the respective gaming machines 302*a*, 302*b*, 302*c*, which each comprises at least one display, for example, the two displays 503*a*, 504*a* for machine 502*a* shown in the example of FIG. 5. In accordance with embodiments of the present invention, each display may be, for example, an LCD, LED, or OLED panel which may be flat or curved.

The display system 304 for gaming system 300 comprises three stepped display elements 304*a*, 304*b*, and 304*c*. In an example, each display element 304*a*, 304*b*, and 304*c* is formed from a plurality of display panels, for example, LCD, LED, or OLED panels. The display system 304 further comprises a display controller (not shown) that is coupled to the display elements 304*a*, 304*b*, and 304*c* and is arranged to control the display of respective graphical representations on at least the first and second display elements 304*a*, 304*b* in a manner such that an animation is displayed on the display elements 304*a*, 304*b* wherein the animation comprises components arranged to provide a visual effect of the components receding into the background, which is enhanced by the display elements 304*a*, 304*b* being set back relative to one another. As shown in FIG. 3, the three display elements 304*a*, 304*b*, 304*c* are configured to be mounted relative to the gaming machines 302*a*, 302*b*, and 302*c* in a manner such that (i) the first display element 304*a* is mounted above the gaming machines 302*a*, 302*b*, and 302*c* with its front display face in approximately the same plane as the topper displays mounted to the gaming machines, (ii) the second display element 304*b* is mounted above, and set back relative to the plane of the topper displays and hence the first display element 304*a*, and (iii) the third display element 304*c* is mounted above, and set back relative to, the second display element 304*b*. In use, the configuration of the display elements 304*a*, 304*b*, and 304*c* relative to each other interacts with the components of the animation displayed on the display elements 304*a*, 304*b*, and 304*c* in order to enhance the visual effect of the components of an animation displayed on at least two of the display elements that recedes into the background. In other words, the spatial arrangement of the display elements interacts with the components of the animation displayed on the display elements that are arranged to provide an impression or visual effect of the components receding into the background, such that an improved perception of depth in the animation displayed on the display system 304 is provided. This improved perception of depth contributes to an enhanced visual experience for the players, and an overall enhanced gaming experience.

Features relating to the animation and components of the animation will be described in more detail below with reference to FIGS. 7 to 11.

Referring to FIG. 4 and FIG. 5, a perspective close-up view of another embodiment of a display system 400 for a gaming system comprising a bank of gaming machines and a perspective view of a gaming system 500 comprising the display system 400 mounted above a bank of gaming machines 502 are shown. In this embodiment, the gaming system 500 comprises two back to back rows of five adjacent gaming machines. In FIG. 5 it is only possible to see the five gaming machines 502*a*, 502*b*, 502*c*, 502*d*, 502*e* of a first row in their entirety, however it is possible to see the button deck 504 of one of the machines in the second row. A display system 400 is mounted above the bank of gaming machines 502. In this particular example, each gaming machine 502*a*, 502*b*, 502*c*, 502*d*, 502*e* has a primary display 503*a*, 503*b*, 503*c*, 503*d*, 503*e* and a secondary display 504*a*, 504*b*, 504*c*, 504*d*, 504*e*. A respective topper display 506*a*, 506*b*, 506*c*, 506*d*, 506*e* is mounted above each of the secondary displays. The display system 400 comprises three display elements for each row of gaming machines such that a first set of three display elements 402*a*, 402*b*, and 402*c* is mounted relative to the first row of gaming machines 502*a*, 502*b*, 502*c*, 502*d*, 502*e*. The first set of three display elements 402*a*, 402*b*, and 402*c* is mounted relative to the first row of gaming machines 502*a*, 502*b*, 502*c*, 502*d*, 502*e* in a manner such that (i) the first display element 402*a* is mounted above the gaming machines 502*a*, 502*b*, 502*c*, 502*d*, 502*e* in approximately the same plane as the topper displays (ii) the second display element 402*b* is mounted above, and set back relative to, the first display element 402*a*, and (iii) the third display element 402*c* is mounted above, and set back relative to, the second display element 402*b*. In this regard, the dimensions and arrangement of the gaming system 500 with the back to back rows of five gaming machines provides a limitation on the dimensions of the display system 400 and the number of display elements of the display system 400 which can be mounted stepped back relative to each other above each row the gaming machines.

In one specific example, the gaming system 500 comprising two back to back rows of five adjacent gaming machines spans a length of approximately 4375 mm and is suited to a display system 400 having an overall length of 3982 mm. The width of the gaming system 500 depends on the structure of the EGMs and is in this example suited to a display system 400 having an overall width of 755 mm. In another specific example, the gaming system 500 has dimensions suited to a display system 400 having an overall length of 4014 mm and an overall width of 755 mm. The inventors have found that a display system 400 having an overall width of this size, and for example, in a range between 700 mm and 800 mm, is suited to three display elements stepped back relative to each other for each row of gaming machines

502 in a manner as described above to allow a setback that enhances the animation. However, a display system 400 having an overall width in a range wider than 800 mm may be suited to more than three display elements stepped back relative to each other if a setback of the display elements that enhances the animation is allowed within the physical constraints.

As for gaming system 300, the display system 400 further comprises a display controller (not shown) that is coupled to each set of three display elements for each row of gaming machines and is arranged to control the display of respective graphical representations on at least two of the display elements for each set of three display elements in a manner such that an animation is displayed on the at least two display elements wherein the animation comprises components arranged to provide a visual effect of the components receding into the background, which is enhanced by the display elements being set back relative to one another. The display controller is coupled to the first set of three display elements 402*a*, 402*b*, and 402*c* and is arranged to control the display of respective graphical representations on at least the first and second display elements 402*a*, 402*b* in a manner such that, in use, an animation is displayed on the display elements 402*a*, 402*b* wherein the animation comprises components arranged to provide a visual effect of the components receding into the background. In use, the configuration of the three display elements 402*a*, 402*b*, and 402*c*, relative to each other interacts with the components of the animation displayed on the display elements 402*a*, 402*b*, and 402*c* in order to enhance the visual effect of the components of an animation displayed on at least two of the display elements that recedes into the background. In the present example, each display element 402*a*, 402*b*, and 402*c* comprises one display panel. It will however be understood that it is also envisaged that at least one of the display elements of the display system 400 comprises at least two display panels. In one example, at least one of the display elements is formed from a plurality of display panels, such as a row of adjacent display panels.

Features associated with the display controller and the animation in use displayed on the display system will be further discussed below with reference to FIGS. 7 to 11.

Figure 6:
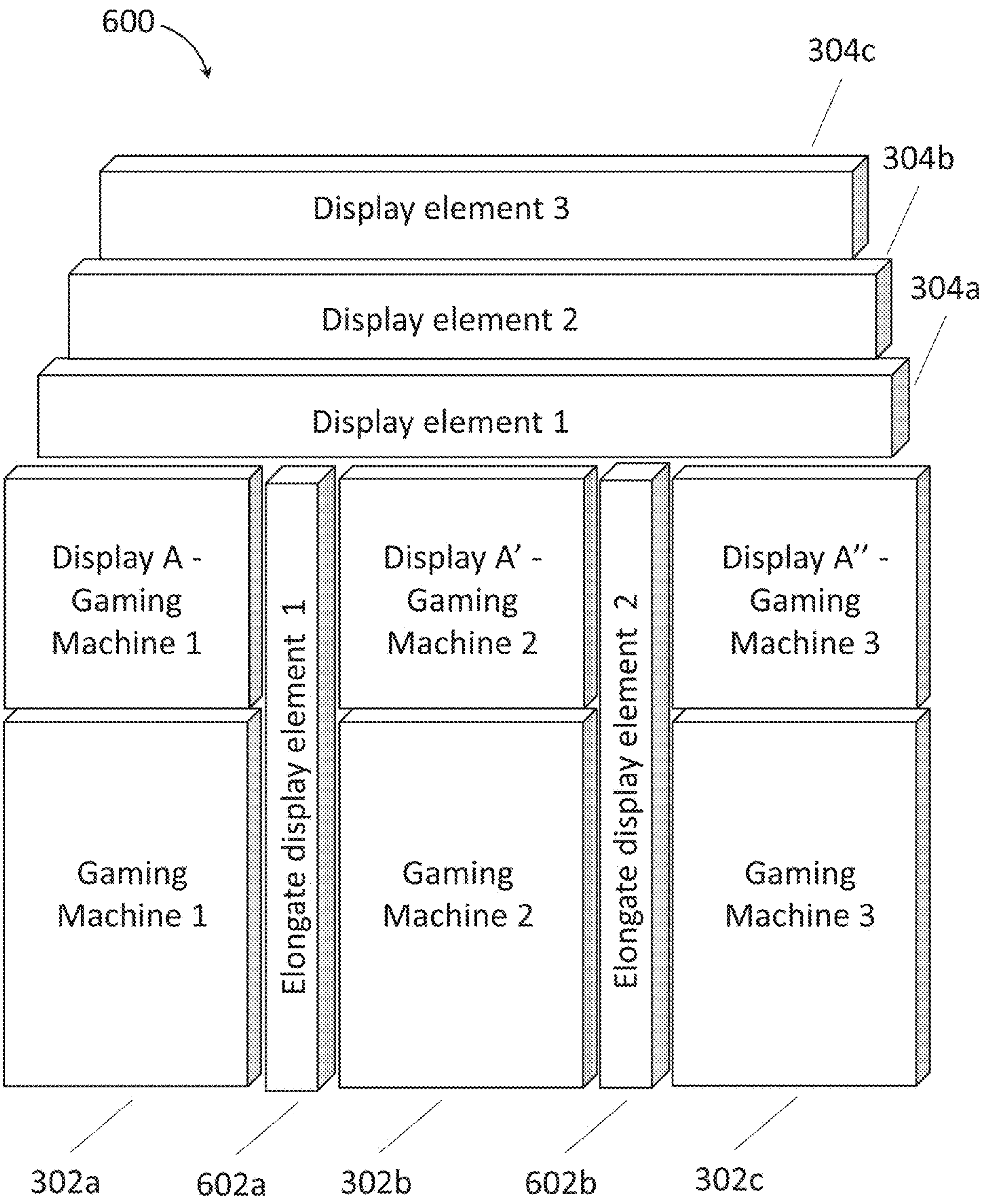
FIG. 6 is a schematic perspective representation of a gaming system comprising the display system of FIG. 4 and display elements between adjacent gaming machines in accordance with a further embodiment.
Figure 7:
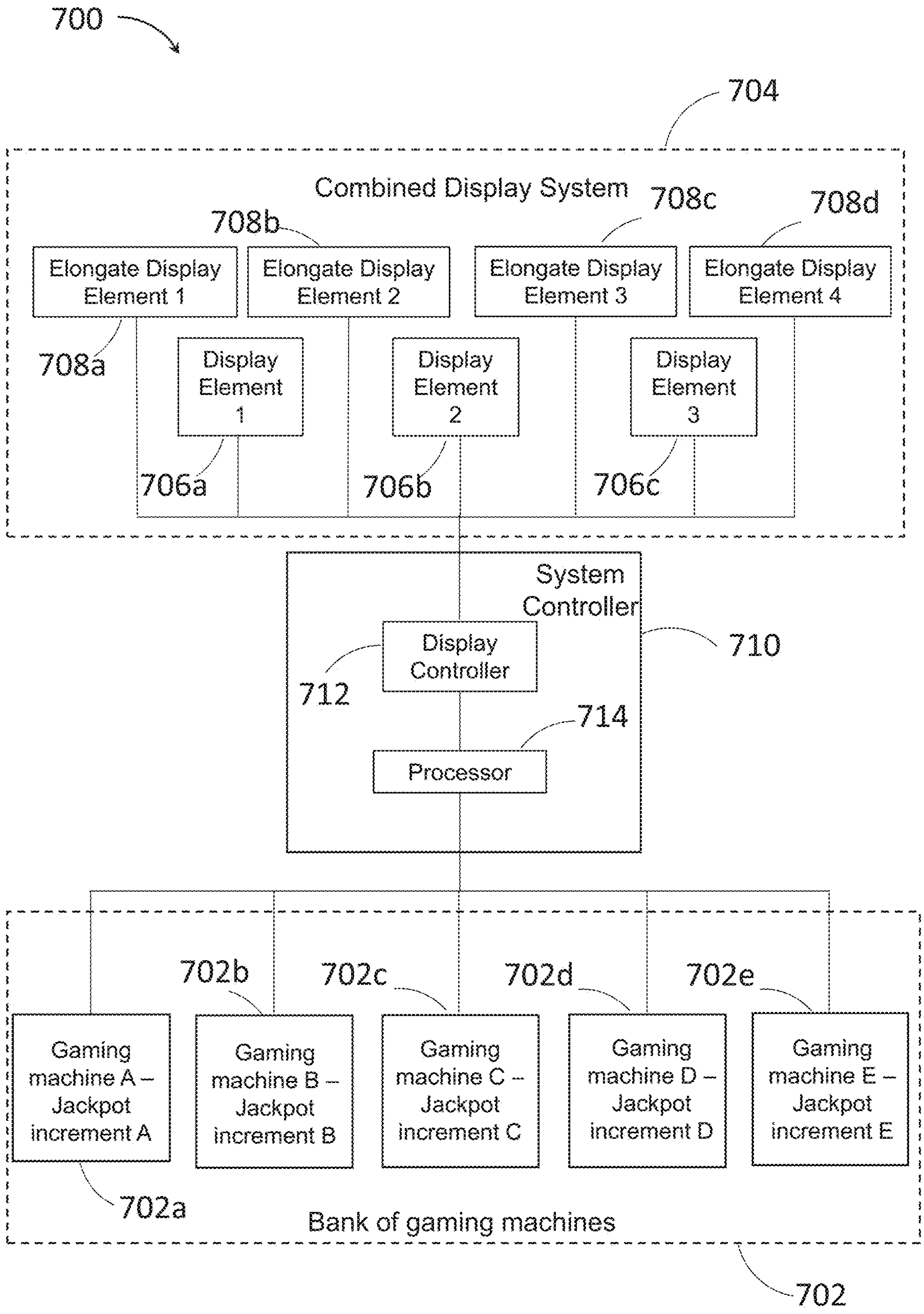
FIG. 7 is a block diagram of the functional components of a gaming system in accordance with an embodiment.

FIGS. 6 and 7 relate to a gaming system provided in accordance with a further specific embodiment of a display system. FIG. 6 shows a schematic perspective representation of gaming system 600, which comprises a bank of gaming machines and wherein the display system is similar to the display systems 304, 400 in accordance with the embodiments described with reference to FIGS. 3 to 5 but additionally has a display element mounted between each pair of adjacent gaming machines. In a specific embodiment, the display element mounted between each pair of adjacent gaming machines is elongate and has a height that corresponds to the height of the bank of gaming machines. Features similar to the features denoted in FIG. 3 will be denoted by similar reference numerals. In the present schematic example, the gaming system 600 comprises a bank of three adjacent gaming machines 302*a*, 302*b*, 302*c*, and a display system comprising the three display elements 304*a*, 304*b*, 304*c* mounted as described with reference to FIG. 3 and two elongate display elements 602*a*, 602*b*, with elongate display element 602*a* mounted between the pair of adjacent gaming machines 302*a* and 302*b*, and elongate display element 602*b* mounted between the pair of adjacent gaming machines 302*b* and 302*c*. Each elongate display element 602*a*, 602*b* is controlled to display a graphical representation indicative of a current level of a jackpot distributable to the gaming machines 302*a*, 302*b*, 302*c*. In the present example, each elongate display element 602*a*, 602*b* is formed from a plurality of display panels arranged relative to each other so as to form a column of display panels. It will however be understood that it is also envisaged that the one or more elongate display elements of gaming system 600 may comprise one elongate display panel only. It is also envisaged that the display element mounted between each pair of adjacent gaming machines may not be elongate and may have any other non-elongate shape suitable for being mounted between each pair of adjacent gaming machines. Each of the gaming machines 302*a*, 302*b*, 302*c* may be any gaming machine suitable for operation and use in a gaming environment such as a casino and may for example be any of the gaming devices illustrated and described with reference to FIGS. 1 and 2. Further, as described with reference to FIGS. 3 and 5, each gaming machine 302*a*, 302*b*, 302*c* is equipped with a respective topper display 306*a*, 306*b*, 306*c* mounted above the respective gaming machines 302*a*, 302*b*, 302*c*, and which each comprise at least one display. Further, it will be understood that although this embodiment has been described for a gaming system comprising three gaming machines and two display elements mounted between each pair of adjacent gaming machines, gaming system 600 may however comprise any other suitable number of gaming machines and corresponding number of display elements mounted between each pair of adjacent gaming machines, such as, however not limited to, five gaming machines as will now be described below in relation to FIGS. 7-12.

FIG. 7 shows a block diagram of the functional components of a gaming system 700 provided in accordance with the specific embodiment illustrated in FIGS. 8A-8D. Gaming system 700 comprises a bank of five gaming machines 702*a*, 702*b*, 702*c*, 702*d*, 702*e* and a display system 704 that includes (i) three display elements 706*a*, 706*b*, 706*c* configured to be mounted above the gaming machines 702*a*, 702*b*, 702*c*, 702*d*, 702*e* in a manner as described with reference to FIGS. 3-5, and (ii) four display elements 708*a*, 708*b*, 708*c*, 708*d* configured to be mounted between respective pairs of adjacent gaming machines, in this specific example, four elongate display elements. The gaming system further comprises a system controller 710 that is coupled to the bank of gaming machines 702 and to the display system 704. The system controller 710 comprises a display controller 712 that is coupled to the display elements 706*a*, 706*b*, 706*c* and is arranged to control the display of respective graphical representations on each of the display elements 706*a*, 706*b*, 706*c* in a manner such that, in use, an animation is displayed in at least two of the display elements, wherein the animation comprises components arranged to provide a visual effect of the components receding into the background. Further, the display controller 712 is also coupled to the elongate display elements 708*a*, 708*b*, 708*c*, 708*d* and is configured to control the display of respective graphical representations on each of the elongate display elements in a manner such that, in use, an animation is displayed in each of the elongate display elements 708*a*, 708*b*, 708*c*, 708*d*. The animations displayed on the display elements 706*a*, 706*b*, 706*c* and the elongate display elements 708*a*, 708*b*, 708*c*, 708*d* are further controlled so as to provide an indication of a level of a jackpot distributable to the gaming machines 702. It will be appreciated that the display controller may comprise first and second display controllers that are arranged to control the display of respective graphical representations on, respectively, the display elements 706*a*, 706*b*, 706*c* and the elongate display elements 708*a*, 708*b*, 708*c*, 708*d*. The system controller 710 further comprises a processor 714 and is arranged to act as a jackpot controller. The system controller 710 is arranged to (i) receive from each gaming machine 702*a*, 702*b*, 702*c*, 702*d*, 702*e* input information based on a wager placed by a user in a game of chance, the input information defining a value of a jackpot increment contributing to a jackpot value for the bank of gaming machines 702, (ii) determine, using processor 714, whether the input information raises the value of the jackpot above one or more threshold value, and (iii) in response to determining that the input information raises the value of the jackpot above a threshold value, control the elongate display elements 708*a*, 708*b*, 708*c*, 708*d*, using the display controller 712, to display an updated graphical representation indicative of a next level of the jackpot distributable to the gaming machines. In response to determining that the input information raises the value of the jackpot above the same or another threshold value, the system controller 710 is also arranged to control, by means of the display controller 712, the animation displayed on the display elements 706*a*, 706*b*, 706*c*.

An example animation under control of the system controller will now be further described with reference to FIGS. 8A-8D.

Figure 8A:
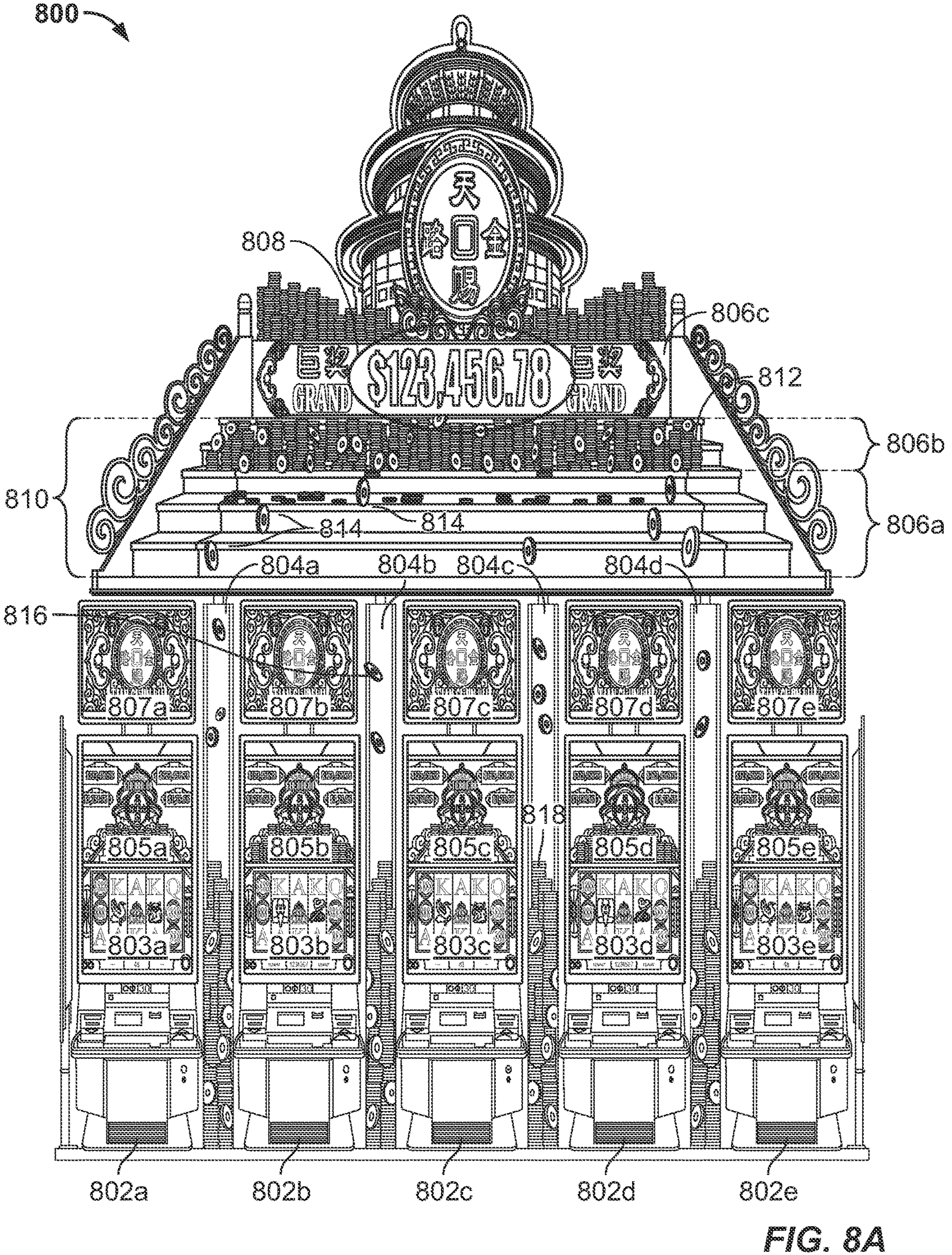
FIGS. 8A-8D are design drawings representing front views of a gaming system comprising display elements in accordance with the embodiment of FIG. 7, and showing displays of respective graphical representations illustrating example components of animations displayed at sequential points in time.
Figure 8B:
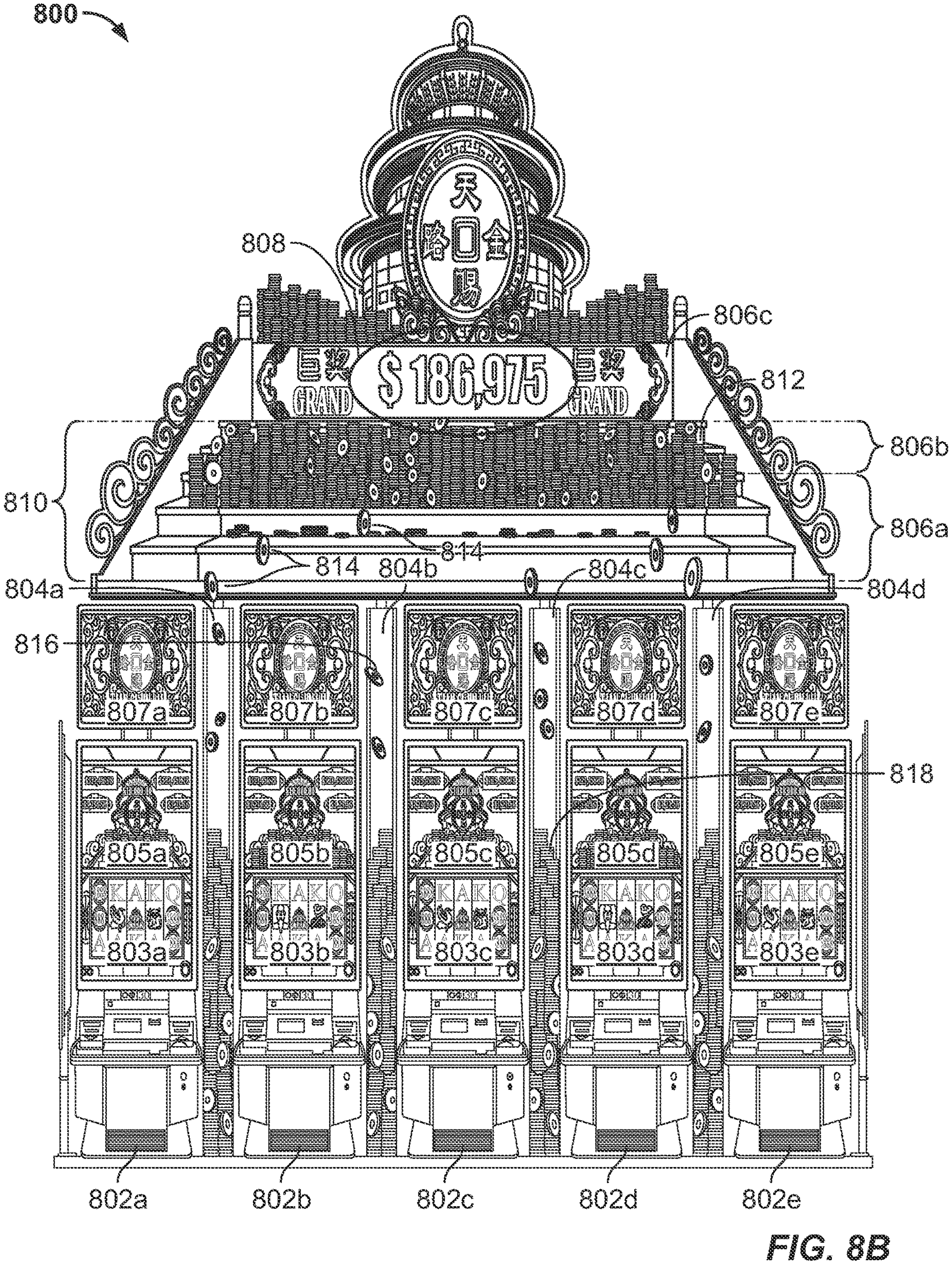
Figure 8C:
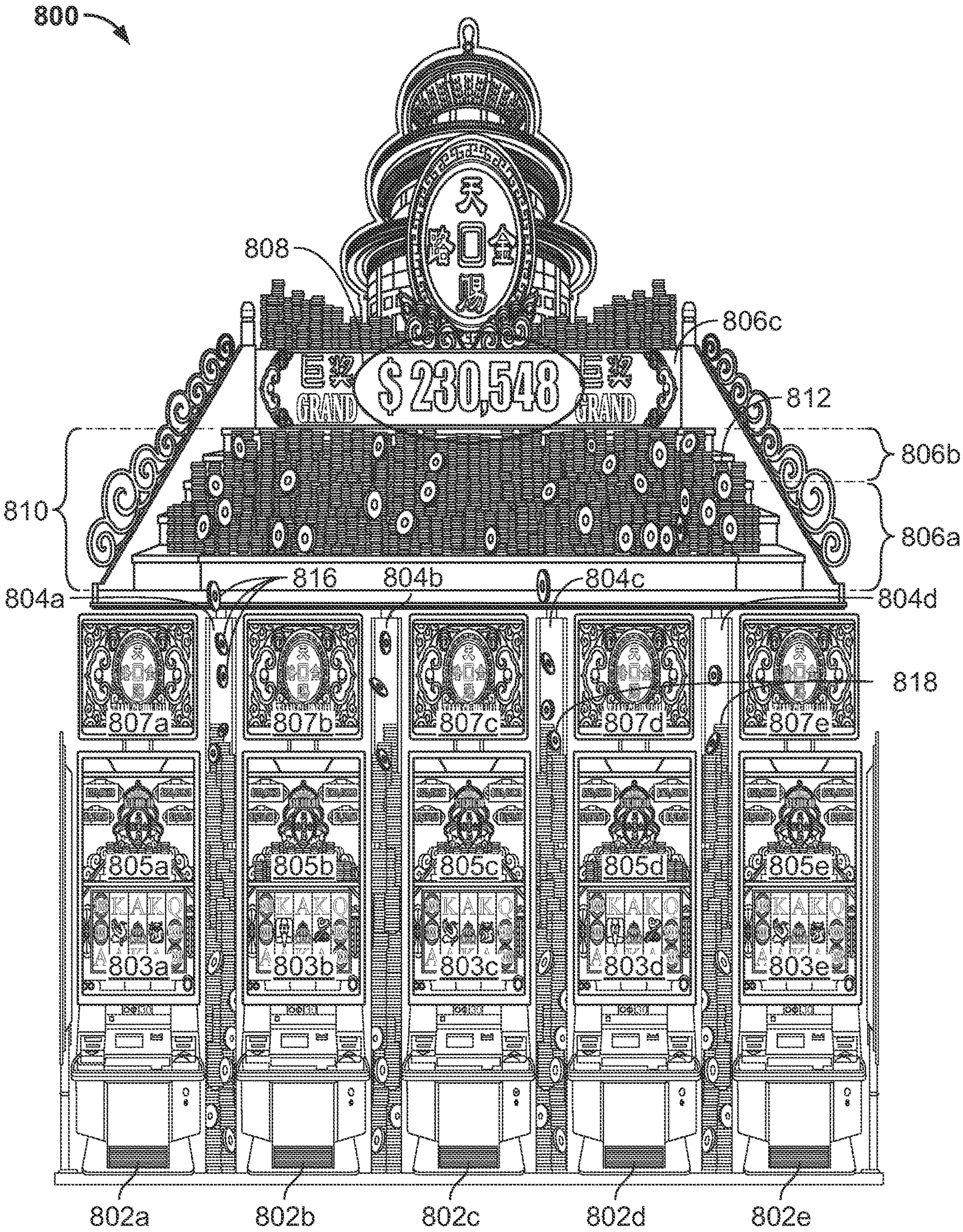
Figure 8D:
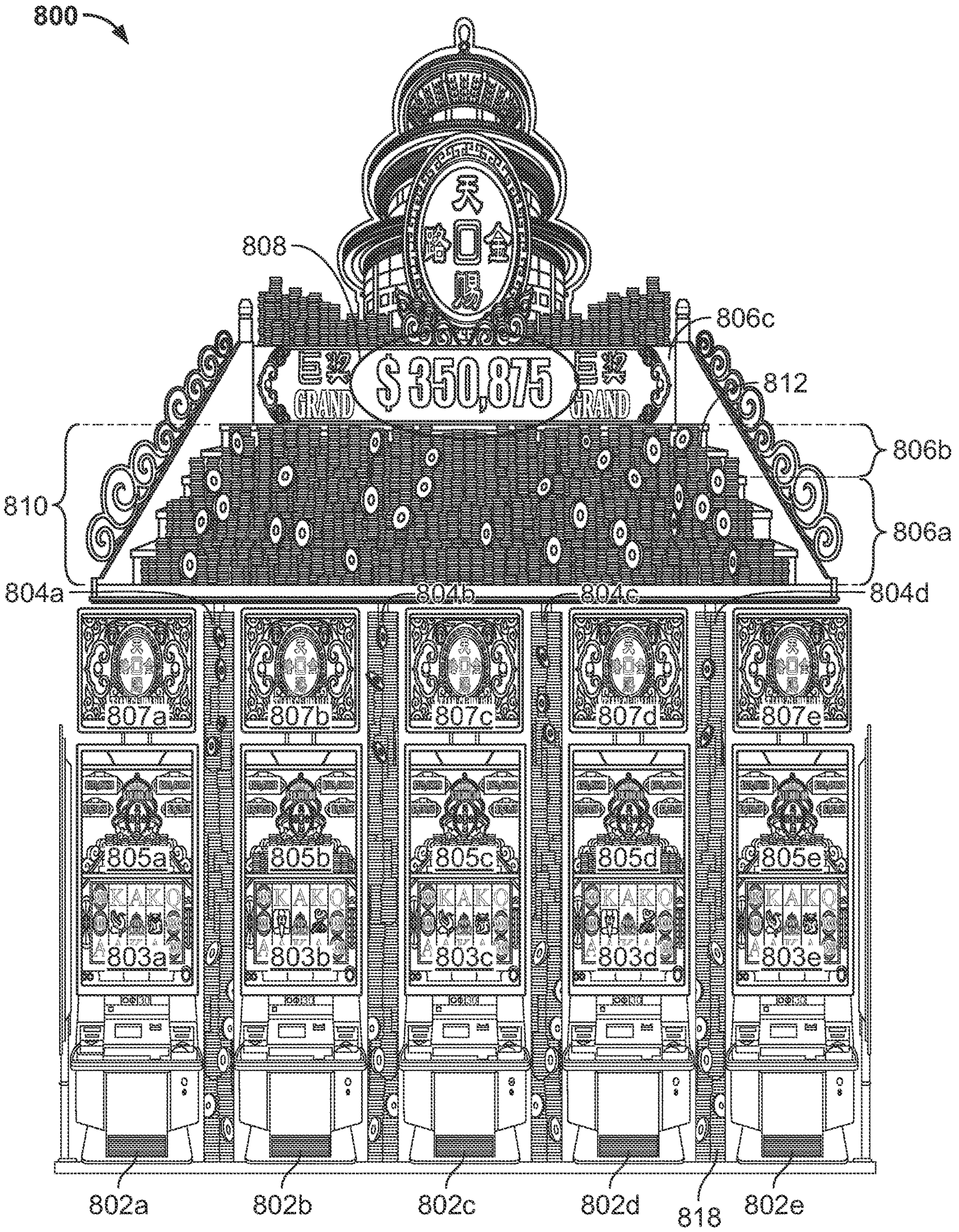

FIGS. 8A-8D show design drawings representing a gaming system 800 and the display components on the display elements of the display system at particular sequential instances in time, respectively, timestamp t1 (FIG. 8A), timestamp t2>t1 (FIG. 8B), timestamp t3>t2 (FIG. 8C), and timestamp t4>t3 (FIG. 8D). It will be appreciated that while each of FIGS. 8A-8D provides an example of the animation at a moment in time, the animation will change from instant to instant.

The gaming system 800 is similar to the schematically represented gaming system 700. Gaming system 800 comprises a bank of five gaming machines 802*a*, 802*b*, 802*c*, 802*d*, and 802*e*, and a display system that comprises (i) four elongate display elements 804*a*, 804*b*, 804*c*, and 804*d*, each respectively positioned between a pair of adjacent gaming machines 802*a*, 802*b*, 802*c*, 802*d*, 802*e*, and (ii) three stepped display elements 806*a*, 806*b*, 806*c* mounted above the bank of gaming machines 802*a*, 802*b*, 802*c*, 802*d*, and 802*e* and stepped back relative to each other as described with reference to FIGS. 3 to 6. Each elongate display element 804*a*, 804*b*, 804*c*, 804*d* has a shape and dimensions suitable to fit and be mounted between a respective pair of adjacent gaming machines 802. In the present example, each elongate display element has an elongated rectangular prism-like shape however it will be understood that any other suitable elongate shape may be employed, and the front display face may alternatively be flat. Each display element 806*a*, 806*b*, 806*c* has a shape and dimensions suitable for the three display elements 806*a*, 806*b*, 806*c* to be mounted relative to the gaming machines in a manner such that (i) the first display element 806*a* is mounted above the gaming machines 802*a*, 802*b*, 802*c*, 802*d*, and 802*e*, (ii) the second display element 806*b* is mounted above, and set back relative to, the first display element 806*a*, and (iii) the third display element 806*c* is mounted above, and set back relative to, the second display element 806*b*. Each display element 806*a*, 806*b*, 806*c* has a shape and dimensions such that when mounted above the bank of gaming machines and arranged stepped back relative to each other as described above, the display elements 806*a*, 806*b*, 806*c* form a pyramid-like shape. Each gaming machine 802*a*, 802*b*, 802*c*, 802*d*, and 802*e* has a primary display 803*a*, 803*b*, 803*c*, 803*d*, 803*e* and a secondary display 805*a*, 805*b*, 805*c*, 805*d*, 805*e*. A respective topper display 807*a*, 807*b*, 807*c*, 807*d*, 807*e* is mounted above each of the secondary displays. The gaming system 800 further comprises a system controller (not shown in FIG. 8) such as the system controller 710 described in FIG. 7. The display controller 712 is arranged to control the display of respective graphical representations on the three display elements 806*a*, 806*b*, 806*c* in a manner such that, in use, an animation of first indicia is displayed on the display elements 806*a* and 806*b* and such that a numeric representation 808 of the grand jackpot prize value distributable to a winning one of the gaming machines 802 is displayed on the third display element 806*c*. As can be observed at the respective points in time t1, t2, t3, and t4 of the animation illustrated in FIGS. 8A-8D, the animation displayed on the display elements 806*a* and 806*b* comprises components that are arranged to provide a visual effect of the components receding into the background. In this respect, the display controller 712 is arranged to control the display of respective graphical representations on each display element 806*a*, 806*b*, 806*c* in a manner such that the animation displayed on the display elements 806*a* and 806*b* is that of a staircase having five steps receding into the background (i.e. comprising five stepped levels 810) on which respective levels of first indicia are displayed that are indicative of a current level of the grand jackpot prize. In this example, the first indicia are associated with coins and a staircase having five steps receding into the background (i.e. comprising five stepped levels 810) on which respective piles or levels of coins are displayed that are indicative of a current level of the grand jackpot prize. The display 806*a* is controlled to display the three upper steps of the staircase and display 806*b* is controlled to display the two lower steps of the staircase, wherein the width of the respective stepped levels 810 decreases from the bottom step in display element 806*a* to the top step in display element 806*b* such that the successive stepped levels 810 appear to recede relative to one another and where the setback between the display elements enhances the player's perception that the upper steps are receding. A numeric representation 808 of the jackpot value distributable to the gaming machines 802 is displayed on a wall on the third display element 806*c*, which appears to be set back relative to the staircase. In the examples illustrated in FIGS. 8A-8C, the animation displayed on the display elements 806*a*, 806*b* comprises a steady component 812 indicative of respective levels of coins in the stepped levels 810, and a moving component 814, which is displayed at a moving rate, the moving component 814 providing an impression that coins are tumbling downwards from the upper stepped levels and into tubes (or in-fills) graphically represented on the four elongate display elements 804*a*, 804*b*, 804*c*, 804*d* such that the animation is also displayed on the four elongate display elements 804*a*, 804*b*, 804*c*, 804*d*. In this respect, the animation displayed on the four elongate display elements 804*a*, 804*b*, 804*c*, 804*d* is controlled by the display controller 712 in a manner such that the animation displayed on these elements also comprises a steady component 816 indicative of a level of coins associated with the level of the jackpot, and a moving component 818 providing an impression that coins are moving in order to provide an impression that the level of the jackpot is increasing based on turnover and hence over time.

Changes in the animation across the sequential instances in time t1, t2, t3, and t4 under the control of the system controller 710 will now be described in further detail with reference to FIGS. 8A-8D.

FIG. 8A shows components of the animation on the display elements at timestamp t1 wherein respective graphical representations indicative of a first level of the jackpot distributable to the gaming machines is displayed on the elongate display elements 804*a*, 804*b*, 804*c*, and 804*d* and the display elements 806*a*, 806*b*, and 806*c*. The display controller 712 is arranged to control (i) the display elements 806*a*, 806*b* to display a steady component 812 representing respective first levels of coins in the stepped levels 810 indicative that the current level of the jackpot distributable to the gaming machines is below a first threshold, and a moving component 814, which is displayed at a moving rate, the moving component 814 providing an impression that coins are tumbling downwards from the upper stepped levels and into the tubes (or in-fills) graphically represented on the four elongate display elements 804*a*, 804*b*, 804*c*, 804*d*, (ii) the display element 806*c* to display a numeric representation 808 of the current value of the grand jackpot prize value distributable to a winning one of the gaming machines 802, and (iii) each of the elongate display elements 804*a*, 804*b*, 804*c*, and 804*d* to display an animation comprising the steady component 816 indicative of a first level of coins associated with the current first level of the jackpot and the moving component 818 providing an impression that coins are moving in order to provide an impression that the level of the jackpot is increasing.

FIG. 8B shows components of the animation on the display elements at timestamp t2>t1 after the processor 714 has determined that the input information received from each active gaming machine 802*a*, 802*b*, 802*c*, 802*d* and 802*e* based on a wager placed by a user in a game of chance on the respective active gaming machine and corresponding jackpot increment value raises the jackpot value above the first threshold value such that a second range of values of a jackpot distributable to the gaming machines is reached, and has controlled the elongate display elements 804*a*, 804*b*, 804*c*, and 804*d* and the display elements 806*a*, 806*b*, and 806*c* to display respective updated graphical representations indicative of the second level of the jackpot. As with FIG. 8A, the display controller 712 is arranged to control the display elements 806*a* and 806*b* to display the steady component 812 representing in the stepped levels 810 respective second levels of coins associated with the next second level of the jackpot (i.e. the level between the first threshold and a second threshold), and the moving component 814, which is displayed at a moving rate, the moving component 814 providing an impression that coins are tumbling downwards from the upper stepped levels and into the tubes (or in-fills) as in FIG. 8A. Display controller 712 continues to control the display element 806*c* to display a numeric representation 808 of the current grand jackpot prize value distributable to a winning one of the gaming machines 802 which is now within a second range above the first threshold. Display controller 712 also controls each of the elongate display elements 804*a*, 804*b*, 804*c*, and 804*d* to display an animation comprising the steady component 816 indicative of a second level of coins associated with the next second level of the jackpot (i.e. the level between the first threshold and a second threshold) and the moving component 818 providing an impression that coins are moving in order to provide an impression that the level of the jackpot is still increasing. When comparing FIG. 8A with FIG. 8B, it can be seen that the two top stepped levels 810 on the display elements 806*a* and 806*b* are entirely filled with coins in FIG. 8A and, when the next second level of a jackpot distributable to the gaming machines is reached illustrated in FIG. 8B, the three top stepped levels 810 are entirely filled with coins.

FIG. 8C further shows components of the animation on the display elements at timestamp t3>t2 after the processor 714 has determined that the input information received from each active gaming machine 802*a*, 802*b*, 802*c*, 802*d* and 802*e* based on a wager placed by a user in a game of chance on the respective active gaming machine and corresponding jackpot increment value raises the jackpot value above the second threshold value such that a third range of values of a jackpot distributable to the gaming machines is reached, and has controlled the elongate display elements 804*a*, 804*b*, 804*c*, and 804*d* and the display elements 806*a*, 806*b*, and 806*c* to display respective updated graphical representations indicative of the third level of the jackpot (i.e. the level between the second threshold and a third threshold). As with FIGS. 8A and 8B, the display controller 712 is arranged to control the display elements 806*a* and 806*b* to display a steady component 812 representing respective third levels of coins in the stepped levels 810 associated with the next third level of the jackpot, and a moving component 814, which is displayed at a moving rate, the moving component 814 providing an impression that coins are tumbling downwards from the upper stepped levels and into the tubes (or in-fills) as in FIG. 8A. The display controller 712 continues to control the display element 806*c* to display a numeric representation 808 of the current grand jackpot prize value distributable to a winning one of the gaming machines 802 which is now within a third range above the second threshold Display controller 712 also controls each of the elongate display elements 804*a*, 804*b*, 804*c*, and 804*d* to display an animation comprising the steady component 816 indicative of a third level of coins associated with the next third level of the jackpot and the moving component 818 providing an impression that coins are moving in order to provide an impression that the level of the jackpot is still increasing. When comparing FIG. 8B and FIG. 8C, it can be seen that the three top stepped levels 810 on the display elements 806*a* and 806*b* are entirely filled with coins in FIG. 8B and, when the next third level of a jackpot distributable to the gaming machines is reached illustrated in FIG. 8C, the four top stepped levels 810 are entirely filled with coins.

FIG. 8D further shows components of the animation on the display elements at timestamp t4>t3 after the processor 714 has determined that the input information received from each active gaming machine 802*a*, 802*b*, 802*c*, 802*d* and 802*e* based on a wager placed by a user in a game of chance on the respective active gaming machine and corresponding jackpot increment value raises the jackpot value above the third threshold value such that a fourth range of values of a jackpot distributable to the gaming machines is reached, and has controlled the elongate display elements 804*a*, 804*b*, 804*c*, and 804*d* and the display elements 806*a*, 806*b*, and 806*c* to display respective updated graphical representations indicative of the fourth level of the jackpot (i.e. the level between the third threshold and a fourth threshold). As in FIGS. 8A-8C, the display controller 712 is arranged to control the display elements 806*a* and 806*b* to display a steady component 812 representing respective fourth levels of coins in the stepped levels 810 associated with the next fourth level of the jackpot. The display controller 712 continues to control the display element 806*c* to display a numeric representation 808 of the current grand jackpot prize value distributable to a winning one of the gaming machines 802 which is now within a fourth range above the third threshold. Display controller 712 also controls each of the elongate display elements 804*a*, 804*b*, 804*c*, and 804*d* to display an animation comprising the steady component 816 indicative of a fourth level of coins associated with the next fourth level of the jackpot. In comparison to FIG. 8C, as the fourth level of the jackpot is reached, all five stepped levels 810 are entirely filled with coins and each elongate display element 804*a*, 804*b*, 804*c*, 804*d* displays a tube, column, or in-fill entirely filled with coins, indicative that a maximum level of coins has been reached and providing an indication to the players on the active gaming machines 802 of the bank that the occurrence of a winning of the grand jackpot prize by one of the gaming machines 802 may be approaching.

Accordingly, even as the current jackpot prize continues to increment and the changing value is displayed, the display controller 712 continues to control the elongate display elements 804*a*, 804*b*, 804*c*, and 804*d* and the display elements 806*a*, 806*b* to display the same respective graphical representations displayed at t4 with the five stepped levels and the tubes (or in-fills) entirely filled with coins.

It will be appreciated that the grand jackpot prize value illustrated by the numeric representation 808 in FIGS. 8A-8D is given by way of example only.

Figure 9:
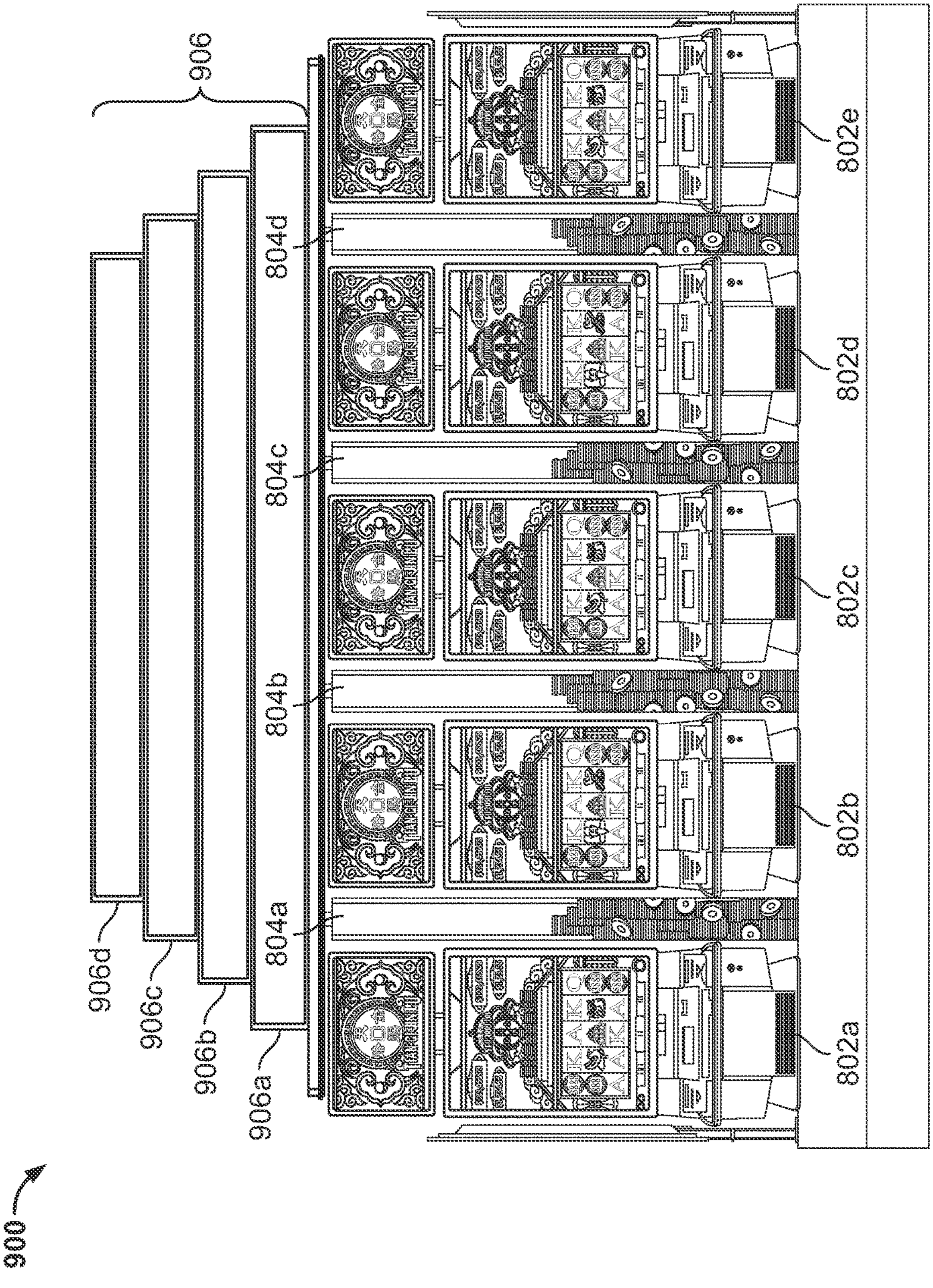
FIG. 9 is a schematic representation of a display system for a gaming system and configured to be mounted above a bank of gaming machines of the gaming system in accordance with a further embodiment.

FIG. 9 illustrates a gaming system provided in accordance with another specific embodiment of a display system. Shown is gaming system 900, which is similar to the gaming system 800 comprising a bank of five gaming machines 802*a*, 802*b*, 802*c*, 802*d*, 802*e* and four elongate display elements 804*a*, 804*b*, 804*c*, and 804*d* mounted between a respectively pair of adjacent gaming machines 802, however differs from the gaming system 800 in that the display system further comprises four display elements 906*a*, 906*b*, 906*c*, and 906*d* instead of the three display elements 806*a*, 806*b*, 806*c*. Similarly to the three display elements 806*a*, 806*b*, 806*c*, the four display elements 906*a*, 906*b*, 906*c*, and 906*d* are mounted above the bank of gaming machines 802*a*, 802*b*, 802*c*, 802*d*, and 802*e* and stepped back relative to each other. Each display element 906*a*, 906*b*, 906*c*, and 906*d* has a shape and dimensions suitable for the four display elements 906*a*, 906*b*, 906*c* and 906*d* to be mounted relative to the gaming machines in a manner such that (i) the first display element 906*a* is mounted above the gaming machines 802*a*, 802*b*, 802*c*, 802*d*, and 802*e*, (ii) the second display element 906*b* is mounted above, and set back relative to, the first display element 906*a*, (iii) the third display element 906*c* is mounted above, and set back relative to, the second display element 906*b*, and (iv) the fourth display element 906*d* is mounted above, and set back relative to, the third display element 906*c*. In addition, each display element 906*a*, 906*b*, 906*c*, 906*d* has a shape and dimensions such that when mounted above the bank of gaming machines and arranged stepped back relative to each other as described above, the display elements 906*a*, 906*b*, 906*c*, 906*d* form a pyramid-like shape. In this embodiment, the display controller 712 is arranged to control the display of respective graphical representations on the four display elements 906*a*, 906*b*, 906*c*, 906*d* in a manner such that an animation is displayed on at least two of the display elements 906*a*, 906*b*, 906*c*, 906*d*. For example, in use, an animation of coins in the form of a staircase with stepped levels on which piles of coins are displayed and indicative of a current level of the grand jackpot prize may be displayed on the three display elements 906*a*, 906*b*, 906*c*, the animation comprising a steady component and a moving component as described in relation to FIG. 8. A numeric representation of the grand jackpot prize value distributable to a winning one of the gaming machines 802 may be displayed on the fourth display element 906*d*. FIG. 9 provides an example of graphical representations in use displayed in the respective groups of displays of gaming machines 902*a*, 902*b*, 902*c*, 902*d*, and 902*e*, and of graphical representations illustrating an example of a steady component of the animation in use displayed on the elongate display elements 904*a*, 904*b*, 904*c*, and 904*d* at a moment in time. The moving component of the animation is not shown in FIG. 9. It will be appreciated that the number of display elements mounted above the bank of gaming machines and arranged stepped back relative to one another will be limited by the dimensions and arrangement of the gaming system, as was discussed in the embodiment of gaming system 500 with reference to FIG. 5. In another example wherein the gaming system is positioned against a wall and comprises one row of gaming machines, some limitations would also apply in regard to the dimensions of the display system including the number of stepped display elements.

Further, it will be understood that although the set of stepped display elements 806*a*, 806*b*, 806*c* and set 906*a*, 906*b*, 906*c*, 906*d* have respectively been described as having shapes and dimensions such that, when mounted above the bank of gaming machines, the respective set of display elements forms a pyramid-like shape, the display elements 806*a*, 806*b*, 806*c* or 906*a*, 906*b*, 906*c*, 906*d* may however have any other suitable shape and dimensions such that when mounted above the bank of gaming machines, the respective set of display elements forms a shape other than a pyramid-like shape.

Figure 10:
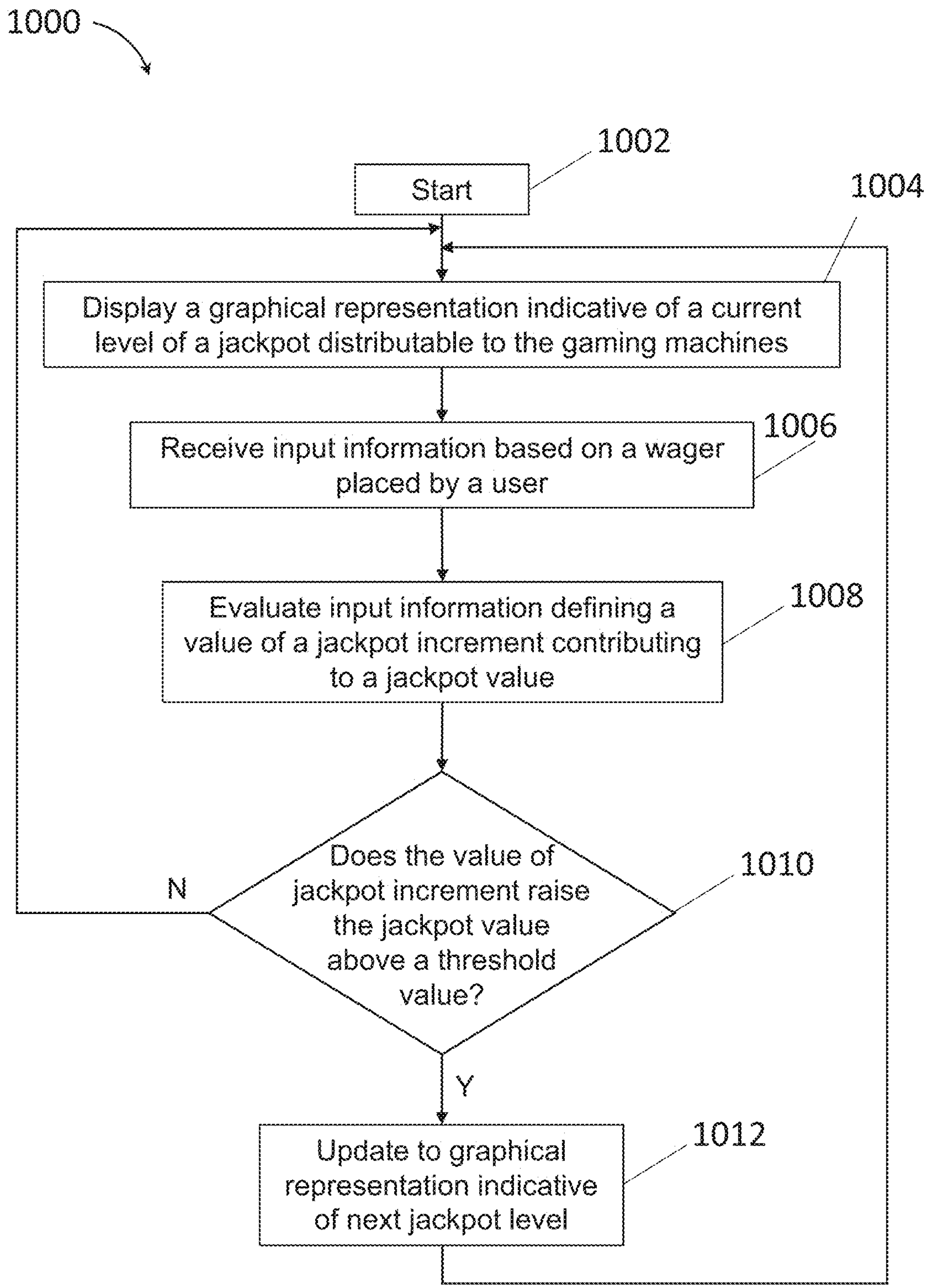
FIG. 10 is a flow diagram of a method of operating a gaming system in accordance with an embodiment.
Figure 11:
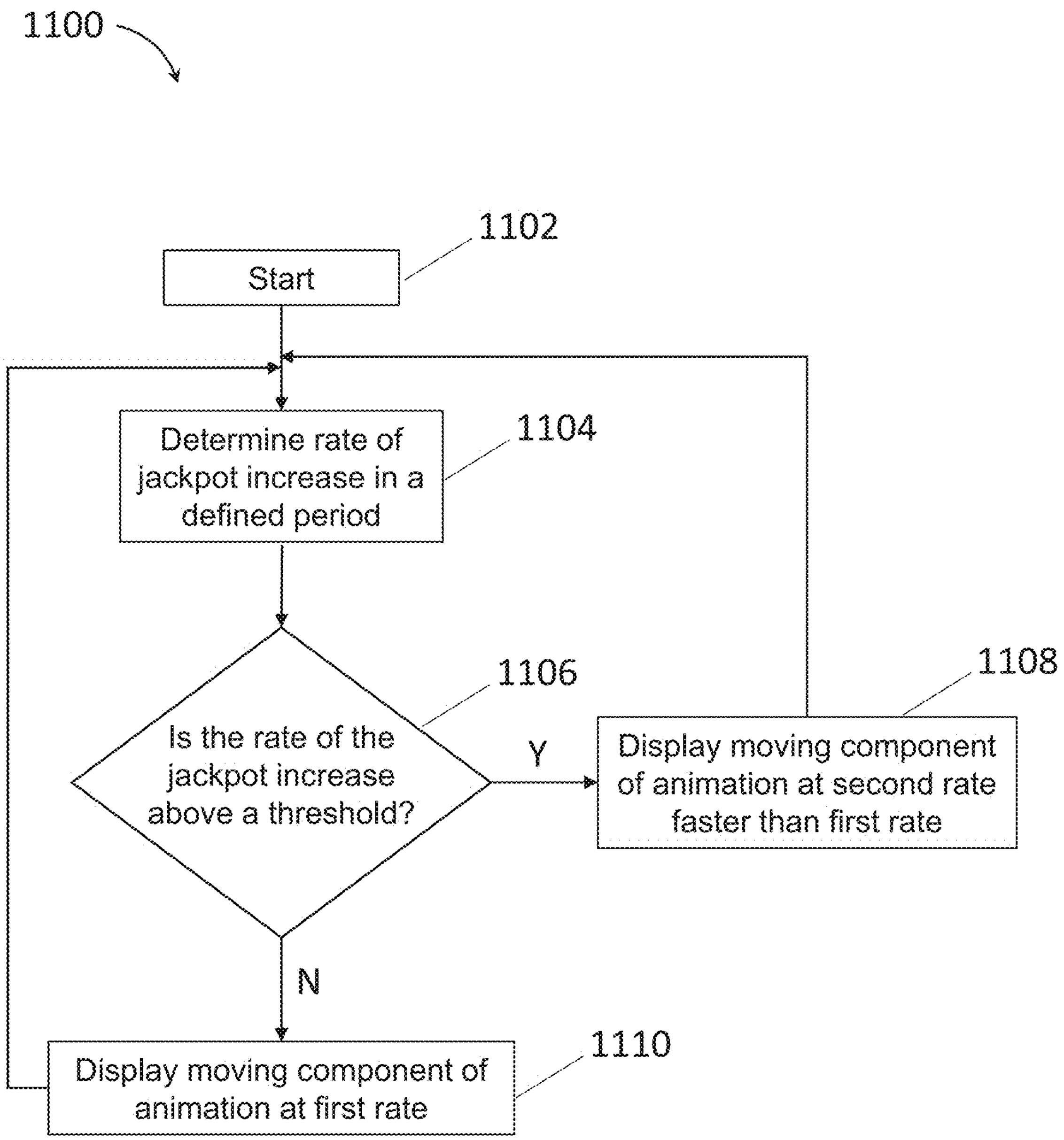
FIG. 11 is a flow diagram of a method of operating a gaming system in accordance with a further embodiment.

FIGS. 10 and 11 show flow diagrams 1000 and 1100 illustrating methods of operating the gaming system provided in accordance with the example illustrated in FIGS. 7-8 and could also be used with other examples such as the ones illustrated in FIGS. 3-6. The processes 1000 and 1100 relate to respective methods of controlling the display of graphical representations on the display system 704 based on input information in use received by the system controller 710 from each gaming machine of the bank of gaming machines 802. FIGS. 10 and 11 will be described with reference to gaming systems 700 and 800. Specifically, process 1000 starts at step 1002. At step 1004, the display controller 712 controls the elongate display elements 804*a*, 804*b*, 804*c*, and 804*d*, and the display elements 806*a*, 806*b*, and 806*c* to display a respective graphical representation indicative of a current level of a jackpot distributable to the gaming machines. The step 1004 may be implemented as described with reference to the particular example in FIG. 8A.

At step 1006, the system controller 710 receives input information from each active gaming machine of the bank of gaming machines 802, the input information being based on a wager placed by a user in a game of chance played on the respective active gaming machine 802, evaluates the input information defining a value of a jackpot increment contributing to the jackpot value and, from this evaluation, determines at step 1010 whether the value of the jackpot increment raises the jackpot value above one or more threshold value. If the value of the jackpot increment raises the jackpot value above a threshold value, the process proceeds to step 1012 wherein the system controller 710 and more specifically, the display controller 712, controls the elongate display elements 804*a*, 804*b*, 804*c*, and 804*d*, and the display elements 806*a*, 806*b*, and 806*c* to display a respective updated graphical representation indicative of a next level of a jackpot distributable to the gaming machines, as was described in relation to the examples illustrated in FIGS. 8B-8D. If however the value of the jackpot increment does not raise the jackpot value above a threshold value, the process returns to step 1004 and the system controller 710 and more specifically, the display controller 712, controls the elongate display elements 804*a*, 804*b*, 804*c*, and 804*d*, and the display elements 806*a*, 806*b*, and 806*c* to display the same graphical representation indicative of the same current level of the jackpot distributable to the gaming machines.

With reference to FIG. 11, the process starts at step 1102. As described above in relation to the example of FIG. 8A, the system controller 710 is arranged to control the elongate display elements 804*a*, 804*b*, 804*c*, and 804*d* to display an animation comprising a steady component 816 indicative of a level of coins associated with the level of the jackpot, and a moving component 818 providing an impression that coins are moving, whereby an impression that the level of the jackpot is increasing is provided. The system controller 710 is further arranged to control the display elements 806*a*, 806*b*, 806*c* to display an animation on the display elements 806*a* and 806*b* comprising a steady component 812 indicative of respective levels of coins in the stepped levels 808, and a moving component 814 providing an impression that coins are moving from one stepped level down to another stepped level. At step 1102, the moving component 818 is, in use, displayed at a first moving rate and the moving component 814 is, in use, displayed at a first level down moving rate. It will be understood that the first moving rate and the first level down moving rate may or may not be the same. As users play on the gaming machines 802, the system controller 710 receives input information from each active gaming machine of the bank of gaming machines 802, the input information being based on a wager placed by a user in a game of chance played on the respective active gaming machine 802, and evaluates the input information at step 1104 to determine a rate of jackpot increase in a defined period, for example the last five minutes. The processor 714 then determines at step 1106 whether the rate of the jackpot increase is above a threshold rate value. If the rate value of the jackpot increase is above the threshold rate value, the process proceeds to step 1108 wherein: (i) the display controller 712 controls the display of the moving component 818 of the animation on the elongate display elements 804*a*, 804*b*, 804*c*, and 804*d* in a manner such that the moving component 818 is displayed at a second moving rate faster than the first moving rate, whereby an impression that the coins are moving faster is provided; and (ii) the display controller 712 controls the display of the moving component 814 of the animation on the display elements 806*a*, 806*b*, 806*c* in a manner such that the moving component 814 is displayed at a second level down moving rate faster than the first level down moving rate, whereby an impression that the coins are moving faster from one stepped level 808 down to another stepped level 808 is provided. The process 1100 then returns to step 1104 wherein the rate of jackpot increase in a defined period is evaluated by the processor 714 based on input information in use received from each active gaming machine of the bank of gaming machines 802 as users keep on placing wagers in games of chance played on the gaming machines 802.

If however, the rate value of the jackpot increase is below the threshold rate value, the method 1100 proceeds to step 1110 wherein: (i) the display controller 712 controls the display of the moving component 818 of the animation on the elongate display elements 804*a*, 804*b*, 804*c*, and 804*d* in a manner such that the moving component 818 remains displayed at the first moving rate; and (ii) the display controller 712 controls the display of the moving component 814 of the animation on the display elements 806*a*, 806*b*, 806*c* in a manner such that the moving component 814 remains displayed at the first level down moving rate. The process 1100 then returns to step 1004 wherein the rate of jackpot increase in a defined period is evaluated by the processor 714 based on input information in use received from each active gaming machine of the bank of gaming machines 802 as users keep on placing wagers in games of chance played on the gaming machines 802.

It will be appreciated that although FIGS. 8 to 11 have been described for a specific embodiment wherein the first indicia are associated with coins displayed in the display elements, indicia associated with elements other than coins may be envisaged. The display of more than one type of indicia in the display elements, such as first and second indicia, wherein the second indicia are different from the first indicia, is also envisaged.

The display system 704 provided in accordance with the embodiment illustrated in FIGS. 7 and 8 provides a greater apparent perception of depth in the animation and facilitates the visualization by users in real time of the relative changes in the jackpot level or grand jackpot prize as wagers are placed on gaming machines. These improvements contribute to an enhanced overall visual experience for the players and may further promote additional excitement and engagement of the players for an overall enhanced gaming experience.

It is to be understood that, if any prior art is referred to herein, such reference does not constitute an admission that the prior art forms a part of the common general knowledge in the art in any country.

In the claims which follow and in the preceding description, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the disclosure.

What is claimed is:

1. A display system for a gaming system comprising a bank of gaming machines, the display system comprising:

a first display element and a second display element shared by the bank of gaming machines, each of the first display element and the second display element corresponding to a level of jackpots distributable to the bank of gaming machines, each gaming machine having a respective display; and a display controller coupled to the first display element and the second display element, and having a processor and a memory storing instructions, which, when executed, cause the processor to at least control the first display element and the second display element to display respective graphical representations including an animation that comprises components providing a visual effect of the components receding into a background for the level of jackpots, wherein the first display element and the second display element are operable to be mounted relative to the bank of gaming machines such that the first display element is mounted above the bank of gaming machines and the second display element is mounted above, and set back relative to, the first display element, and wherein the first display element is configured relative to the second display element, and the first display element and the second display element are configured to be set back relative to the bank of gaming machines and interact with the components of the animation for the level of jackpots to enhance the visual effect of the components receding into the background.

2. The display system of claim 1, wherein at least one of the first display element and the second display element comprises at least two display panels.

3. The display system of claim 1, wherein the animation comprises displaying at least two stepped levels associated with one or more first indicia.

4. The display system of claim 3, wherein the animation further comprises:

a steady component indicative of the one or more first indicia in the at least two stepped levels displayed on the first display element and the second display element, respectively; and a moving component moving the one or more first indicia from one stepped level down to a different stepped level at a moving rate.

5. The display system of claim 4, wherein the steady component is associated with a current level of a jackpot that is distributable to the bank of gaming machines.

6. The display system of claim 4, wherein the instructions, when executed, cause the processor to animate the one or more first indicia as a plurality of coins, respective levels of coins in the at least two stepped levels as the steady component, and at least some of the plurality of coins as the moving component moving from the one stepped level down to the different stepped level.

7. The display system of claim 6, wherein at least one of the respective levels of coins increases when a current level of a jackpot that is distributable to the bank of gaming machines increases to a next jackpot level.

8. The display system of claim 5, wherein the moving rate increases when the jackpot increases at a defined rate that is above a threshold rate.

9. The display system of claim 1, further comprising a jackpot display element coupled to the display controller, and wherein the instructions, when executed, cause the jackpot display element to display a numeric representation of a jackpot that is distributable to the bank of gaming machines.

10. A method of operating a gaming system comprising a bank of gaming machines, a display controller, a first display element, and a second display element, a first display element and a second display element shared by the bank of gaming machines, each of the first display element and the second display element corresponding to a level of jackpots distributable to the bank of gaming machines, each gaming machine having a respective display, the first display element being mounted above the bank of gaming machines, and the second display element is mounted above and set back relative to the first display element, the method comprising:

displaying respective graphical representations on the first display element and the second display element; and controlling, using the display controller, the first display element and the second display element to display an animation that comprises components providing a visual effect of the components receding into a background, and interacts with the first display element and the second display element to enhance the visual effect of the components receding into the background for the level of jackpots.

11. The method of claim 10, wherein the animation comprises at least two stepped levels associated with one or more first indicia.

12. The method of claim 11, further comprising:

animating a steady component indicative of the one or more first indicia in the at least two stepped levels displayed on the first display element and the second display element, respectively; and animating a moving component moving the one or more first indicia from one stepped level down to a different stepped level at a moving rate.

13. The method of claim 11, further comprising displaying a numeric representation of the jackpot that is distributable to the bank of gaming machines.

14. The method of claim 12, wherein the steady component is associated with a level of a jackpot that is distributable to the bank of gaming machines.

15. The method of claim 12, further comprising animating the one or more first indicia as a plurality of coins, respective levels of coins in the at least stepped levels as the steady component, and at least some of the plurality of coins as the moving component moving from the one stepped level down to the different stepped level.

16. The method of claim 15, further comprising animating an increase of at least one of the respective levels of coins when a current level of a jackpot that is distributable to the bank of gaming machines increases to a next jackpot level.

17. The method of claim 14, further comprising animating an increase of the moving rate of the moving component when the jackpot increases at a defined rate that is above a threshold rate.

18. A gaming system comprising:

a bank of gaming machines, each gaming machine having a respective display;

a display element operable to be mounted between and shared by adjacent gaming machines of the bank of gaming machines and having a plurality of display elements operable to display a graphical representation indicative of a current level of a plurality of levels for jackpots distributable to the bank of gaming machines; and a system controller coupled to the bank of gaming machines and the display element, having a processor and a memory storing instructions, which, when executed, cause the processor to at least:

receive, from each of the bank of gaming machines, input information based on a wager placed by a user in a game of chance, the input information defining a value of a jackpot increment contributing to a jackpot value for the bank of gaming machines, determine whether the input information raises the jackpot value above one or more threshold value, and in response to determining that the input information raises the jackpot value above the one or more threshold value, control the display element to display an updated graphical representation indicative of a next level of the jackpots distributable to the bank of gaming machines.

19. The gaming system of claim 18, wherein the instructions, when executed, further cause the display element to display an animation comprising:

a steady component indicative of a level of one or more first indicia associated with the level of the jackpot; and a moving component associated with the one or more first indicia being animating as moving as the level of the jackpot increases.

20. The gaming system of claim 19, wherein the instructions, when executed, further cause the processor to animate the steady component, in response to determining that the input information raises the jackpot value above one or more threshold value, to move to an updated level associated with the next level of the jackpot that is distributable to the bank of gaming machines.

* * * * *